US008072381B1

(12) United States Patent
Ziegler

(10) Patent No.: US 8,072,381 B1
(45) Date of Patent: Dec. 6, 2011

(54) LOCATION DETERMINATION IN A WIRELESS NETWORK

(75) Inventor: Philip Ziegler, Montville, NJ (US)

(73) Assignee: Cellco Partnership, Basking Ridge, NJ (US)

(*) Notice: Subject to any disclaimer, the term of this patent is extended or adjusted under 35 U.S.C. 154(b) by 174 days.

(21) Appl. No.: 12/432,983

(22) Filed: Apr. 30, 2009

(51) Int. Cl.
*G01S 1/08* (2006.01)

(52) U.S. Cl. ...................................... 342/386

(58) Field of Classification Search .................. 342/369, 342/386
See application file for complete search history.

(56) References Cited

U.S. PATENT DOCUMENTS

| 2003/0008669 A1* | 1/2003 | Stein et al. | 455/456 |
| 2003/0125045 A1* | 7/2003 | Riley et al. | 455/456 |

OTHER PUBLICATIONS

QUALCOMM Repeater Technologies to Improve Network Performance, 80-W0013-1 Rev A, QUALCOMM Incorporated, 2003.
Reduced carrier In-building solutions and Right sizing of In-building capacity, Verizon Wireless In-Building Forum, May 7, 2008.

* cited by examiner

*Primary Examiner* — Harry Liu
(74) *Attorney, Agent, or Firm* — McDermott Will & Emery LLP

(57) ABSTRACT

A method for improving location determination for a mobile device location of which precludes it from sufficiently accurate determination by a standard position determination mechanism is disclosed. The method includes a step of receiving, at a server and from a mobile device, an indication that the mobile device detects a supplemental position determination signal not associated with an overhead channel set that is transmitted in support of traffic channels required to support voice or data communications. The method also includes steps of referencing a database to identify one or more criteria associated with the supplemental position determination signal; determining that the one or more criteria associated with the supplemental position determination signal indicates that a source generating the supplemental position determination signal is within a close proximity of the mobile device; and identifying the location of the source generating the supplemental position determination signal. The method also includes a step of using the location of the source generating the supplemental position determination signal as the location of the mobile device.

19 Claims, 8 Drawing Sheets

LOCATION DETERMINATION IN A WIRELESS NETWORK

TECHNICAL FIELD

This disclosure relates to methods and systems for improving location determination of a person using a mobile communication device in a wireless network, for example in a situation in which standard position determination mechanism would not be sufficiently accurate or ineffective, e.g., compromised by particular configuration of the network in the person's vicinity.

BACKGROUND

In modern mobile communication networks, the current position determination technologies utilize one or more of four fundamental methods of determining a subscriber's location before it defaults to the location of the serving sector. There are two ranging technologies (e.g., Assisted GPS or AGPS and Advanced Forward Link Trilateration or AFLT). These can be used independently or together and a default solution can be identified by a point associated with the coverage footprint of the serving sector in the mobile network. Both ranging technologies use the mobile device assets to report the relative times of arrival ("TOA") or time difference of arrival ("TDOA") of signals from ranging elements, either GPS satellites or terrestrial base stations, to a network server called a Position Determining Entity ("PDE"). The PDE knows the location of the ranging elements and combines that knowledge with the TOA or TDOA information to generate distances to the mobile device that is the target of the position determination. From the distances, position can be determined. Determining position based upon distance measurements to various known locations of signal source is called Trilateration.

Traditionally, a one-hundred percent (100%) GPS solution provides the most accurate position solutions. This, however, requires sufficient number of satellites be receivable or "visible" for position determination. When the mobile device receives signals from an insufficient number of satellites, a hybrid solution is used, utilizing ranging or distance measurements both from GPS satellites and terrestrial base stations. When three or more base stations are visible, a position fix can be determined even if no satellites are visible. This technique is called Advanced Forward Link Trilateration or AFLT. Lastly, in a scenario in which there are insufficient combinations of satellites and base stations to generate a position estimate, the system may give up calculating an accurate position and may retreat back to the default location of the serving sector as its best guess at a position estimate.

In-building subscribers make up a significant percentage of voice (~70%) and data (~85%) call volumes. Service providers, such as Verizon Wireless™, have many programs in place to bring quality voice and data to in-building subscribers. In-building subscribers, by definition, do not have an unobstructed view of the sky and therefore position determination performance will be compromised due to lack of GPS signals. Furthermore, many in-building solutions involving repeaters and Distributed Antenna Systems ("DAS") can further degrade position determination system performance through the creation of ambiguities in the distance measurements.

Repeaters or bi-directional amplifiers are frequently used to bring RF energy into buildings where subscribers lack coverage ubiquity or capacity sufficiency. Even in a simple configuration with a single donor and single coverage antenna, the process of augmenting voice and data service through these devices delays the RF energy captured from the network as it passes through the repeaters. This delay has been shown to have adverse impacts on subscriber position determination in a variety of RF circumstances known to exist in the macro RF network.

Repeaters or other base station network elements can also feed a DAS. The DAS may have both active and passive components. The circuitous pathways of signal travel, delays caused due to signal speed through the fiber being less than the speed through the air, and delays through active components further decouple signal arrival measurements and distance estimates to reference locations. Further, network optimization protocols often reduce the power that the macro network broadcasts into the DAS-covered venue. This may result in weaker signals of surrounding base stations available for AFLT distance determination between subscriber and ranging reference base stations.

In large venues, where little (if any) GPS signals are available and dedicated base station coverage and capacity is provided through a sophisticated DAS infrastructure, position determination algorithms are further challenged. In such an environment, the base station energy from a single sector is simulcast throughout a predetermined coverage footprint. Simulcasting often refers to a process by which energy is distributed to multiple areas of interest, which may or may not overlap, through different pathways and devices. The process of simulcasting decouples the relationship between the TOA measurements and the references mobile device's location, introducing large errors/uncertainties into the position solution.

Therefore, there is a need for a system and a method that improves the location determination for mobile device users who do not have unobstructed view of the sky. In particular, there is a need for a system and a method that negates or reduces the impacts of DAS simulcasting requirements, noise reduction or artificially introduced delay on the AFLT position determination performance. Similarly, there is a need for a system and a method that negates or reduces the impact of delays that is caused by the repeaters in a non-DAS environment.

SUMMARY

According to one general aspect, a method for improving location determination for a mobile device location of which precludes it from sufficiently accurate determination by a standard position determination mechanism is disclosed. The method includes a step of receiving, at a server and from a mobile device, an indication that the mobile device detects a supplemental position determination signal not associated with an overhead channel set that is transmitted in support of traffic channels required to support voice or data communications.

The method also includes steps of referencing a database to identify one or more criteria associated with the supplemental position determination signal; determining that the one or more criteria associated with the supplemental position determination signal indicates that a source generating the supplemental position determination signal is within a close proximity of the mobile device; and identifying the location of the source generating the supplemental position determination signal. The method also includes a step of using the location of the source generating the supplemental position determination signal as the location of the mobile device.

Implementations of the above general aspect may include one or more of the following features. For example, the source generating the supplemental position determination signal may include a pilot beacon transmitter. The pilot beacon transmitter may be deployed inside an area having an obstructed view of sky to improve the location determination capability within the area. For another example, determining that the source is within a close proximity of the mobile device may include determining that the source is within 150 meters of the mobile device.

The method may further include steps of receiving, at the serve and from the mobile device, an indication that the mobile device detects one or more pilot signals associated with the overhead channel set that is transmitted in support of the traffic channels required to support the voice or data communications; and deciding not to use the one or more pilot signals for determining the position of the mobile device upon determining that the source of the supplemental position determination signal is within the close proximity of the mobile device. The one or more pilot beacon signals may be a downlink overhead channels that the mobile device uses to acquire network's time base for exchanging traffic channel information with a base station. The supplemental position determination signal may be only used to determine the location of the mobile device. The supplemental position determination signal may carry a different identifier than the pilot beacon signal.

The supplemental position determination signal may include a format similar to that of the pilot signal transmitted from a base station. The database may include a Base Station Almanac Database augmented to include records describing the supplemental position determination signal, the records include a sector identification label, a coordinate pair associated with the source of the supplemental position determination signal, and/or a Maximum Antenna Range value field which defines a reasonable boundary for coverage footprint of each of the source of the supplemental position determination signal. The Base Station Almanac Database may further include records for one or more pilot signals transmitted from one or more base stations. The supplemental position determination signal and the one or more pilot signals each correspond to a separate entry in the database. Each database entry may include a coordinate pair associated with the source of the supplemental position determination signal or the pilot signal and a range of coverage of the respective signals.

In another general aspect, the instant application describes a method for improving location determination in a wireless network. The method includes steps of receiving, at a server and from a mobile device, an indication that the mobile device detects a first supplemental position determination signal not associated with an overhead channel set that is transmitted in support of traffic channels required to support voice or data communications. The method also includes a step of receiving, at the server and from the mobile device, an indication that the mobile device detects a second supplemental position determination signal also not associated with the overhead channel set.

The method also includes steps of referencing a database to identify one or more criteria associated with the first and second supplemental position determination signals; determining from the one or more criteria associated with the first and second supplemental position determination signals that the first and second supplemental position determination signals should be used for determining the location of the mobile device. Based on determining that the first supplemental position determination signal should be used for position determination, the method includes a step of determining a location associated with a source of the first supplemental position determination signal. Similarly, based on determining that the second supplemental position determination signal should be used for position determination, determining a location associated with a source of the second supplemental position determination signal. Additionally, the method includes a step of using the locations associated with the sources of the first and second supplemental position determination signals to determine the location of the mobile device.

Implementations of the above general aspect may include one or more of the following features. For example, the method may further include a step of receiving an indication that the mobile device detects one or more pilot signals associated with the overhead channel set that is transmitted with the traffic channels required to support the voice or data communications; and deciding not to use at least one of the one or more pilot signals for determining the position of the mobile device upon determining that the first and second supplemental position determination signals should be used for determining the position of the mobile device.

The source of the first supplemental position determination signal may include a first pilot beacon transmitter deployed within a campus or municipality to improve the location determination capability therein; and the source of the second supplemental position determination signal may include a second pilot beacon transmitter deployed within the campus or municipality to improve the location determination capability therein. The location associated with the source of the first supplemental position determination signal may include the location of the first pilot beacon transmitter. Similarly, the location associated with the source of the second supplemental position determination signal may include the location of the second pilot beacon transmitter. The first and second pilot beacon transmitters may be capable of adjusting their respective time base to compensate for time delays through signal distribution mechanism in another part of the network.

Using the locations associated with the sources of the first and second supplemental position determination signals to determine the location of the mobile device may further include a determination of the time the first supplemental position determination signal was transmitted from the first pilot beacon transmitter and the time the first supplemental position determination signal was received by the mobile device. The difference is determined between the time that the first supplemental position determination signal was transmitted from the first pilot beacon transmitter and the time that the first supplemental position determination signal was received by the mobile device. The location determination may also involve determining the time the second supplemental position determination signal was transmitted from the second pilot beacon transmitter and the time the second supplemental position determination signal was received by the mobile device. The difference is determined between the time the second supplemental position determination signal was transmitted from the second pilot beacon transmitter and the time the second supplemental position determination signal was received by the mobile device. The location determination then entails calculating the location of the mobile device based on these two differences.

The database may include a Base Station Almanac Database supplemented to include a record for each of the first and second supplemental position determination signals, the record including a sector identification label, a coordinate pair associated with the source of the first and second supplemental position determination signals, and/or a Maximum Antenna Range value field which defines a reasonable boundary for coverage footprint of the source of the first and second supplemental position determination signals.

Alternatively, determining the location associated with the source of the first supplemental position determination signal may include determining a coverage area associated with the source of the first supplemental position determination. Similarly, determining the location associated with the source of the second supplemental position determination signal may include determining a coverage area associated with the source of the second supplemental position determination signal. In this scenario, using the locations associated with the sources of the first and second supplemental position determination signals to determine the location of the mobile device may include using an overlap of the coverage area associated with the source of the first supplemental position determination signal and the coverage area associated with the source of the second supplemental position determination signal to determine the location of the mobile device.

The Base Station Almanac Database may further include records for one or more pilot signals transmitted from one or more base stations. The first and second supplemental position determination signals may have a format similar to that of the one or more pilot signals transmitted from the one or more base stations.

According to another general aspect, a system for improving location determination for a mobile device location of which precludes it from sufficiently accurate position determination by a standard position determination mechanism is disclosed. The system includes a first pilot beacon transmitter configured to provide a first supplemental position determination signal coverage in a first area. The first supplemental position determination signal is not associated with an overhead channel set that is transmitted in support of traffic channels required to support voice or data communications. The system also includes a second pilot beacon transmitter configured to provide a second supplemental position determination signal coverage in a second area. The second supplemental position determination signal also is also not associated with the overhead channel set.

The system also includes a server in communications with the first and second pilot beacon transmitters. The server is configured to receive from a first mobile device an indication that the first mobile device detects the first supplemental position determination signal. Furthermore, the server is configured to receive from a second mobile device an indication that the second mobile device detects the second supplemental position determination signal. The server upon receiving the indication that the first mobile device detects the first supplemental position determination signal identifies the location of the mobile device as the location of the first pilot beacon transmitter. The server upon receiving the indication that the second mobile device detects the second supplemental position determination signal identifies the location of the mobile device as the location of the second pilot beacon transmitter.

Implementations of the above general system aspect may include one or more of the following features. For example, the server may receive an indication that one of the first and second mobile devices detect one or more pilot signals that actually are associated with the overhead channel set that is transmitted in support of the traffic channels required to support the voice or data communications. The server may decide not to use the one or more pilot signals for determining the position of the first and second mobile devices. A range of each of the first and second pilot beacon transmitters may be within 150 meters or other known objective for in-building circumstances.

The first and second supplemental position determination signals may be only used for position determination. The server may include a database having an entry corresponding to each of the first and second supplemental position determination signals. The entry corresponding to the first supplemental position determination signal may indicate that the first supplemental position determination signal should exclusively be used for determining the position of the first mobile device. The entry corresponding to the second supplemental position determination signal similarly may indicate that the second supplemental position determination signal should exclusively be used for determining the position of the second mobile device.

The database may include a Base Station Almanac Database supplemented to include for each of the first and second supplemental position determination signals a sector identification label, a coordinate pair associated with the sources of the first and second supplemental position determination signals, and/or a Maximum Antenna Range value field which defines a reasonable boundary for coverage footprint of the sources of the first and second supplemental position determination signals.

According to another general aspect, a method for improving location determination in a wireless network is disclosed. The method includes a step of receiving, at a server and from a mobile device, an indication that the mobile device detects a pilot signal associated with an overhead channel set that is transmitted in support of traffic channels required to support voice or data communications. The method also includes a step of receiving, at the server and from the mobile device, an indication that the mobile device detects a supplemental position determination signal not associated with the overhead channel set.

Additionally, the method includes steps of referencing a database to identify one or more criteria associated with the pilot signal and the supplemental position determination signal and determining from the one or more criteria associated with the pilot signal and the supplemental position determination signal that the pilot signal and the supplemental position determination signal should be used for determining the location of the mobile device. Based on determining that the pilot signal should be used for position determination, the method includes a step of determining a location associated with a source of the pilot signal. Based on determining that the supplemental position determination signal should be used for position determination, the method includes a step of determining a location associated with a source of the supplemental position determination signal. The method also includes a step of using the locations associated with the sources of the pilot signal and the supplemental position determination signal to determine the location of the mobile device.

Implementations of the above general aspect may include one or more of the following features. For example, the source of the pilot signal may include a base station; and the source of the supplemental position determination signal may include a pilot beacon transmitter deployed within a campus or a municipality to improve the location determination capability therein. The location associated with the source of the pilot signal may include the location of the base station; and the location associated with the source of the supplemental position determination signal may include the location of the pilot beacon transmitter. The pilot beacon transmitter may be capable of adjusting its time base to compensate for time delays through signal distribution mechanism in another part of the network.

Using the locations associated with the sources of the pilot signal and the supplemental position determination signal to determine the location of the mobile device may include a determination of the time the pilot signal was transmitted from the base station and the time the pilot signal was received by the mobile device. The difference is determined, between the time that the pilot signal was transmitted from the base station transmitter and the time that the pilot signal was received by the mobile device. The location determination may also involve determining the time the supplemental position determination signal was transmitted from the pilot beacon transmitter and the time the supplemental position determination signal was received by the mobile device. The difference is determined, between the time that the supplemental position determination signal was transmitted from the pilot beacon transmitter and the time that the supplemental position determination signal was received by the mobile device. The location determination then entails calculating the location of the mobile device based on these two differences.

Alternatively, determining the location associated with the source of the pilot signal may include determining a coverage area of the source of the pilot signal. Similarly, determining the location associated with the source of the supplemental position determination signal may include determining a coverage area of the source of the supplemental position determination signal. In this scenario, using the locations associated with the sources of the pilot signal and the supplemental position determination signal to determine the location of the mobile device may include using an overlap between the coverage area of the source of the pilot signal and the coverage area of the source of the supplemental position determination signal to determine the location of the mobile device.

Alternatively, the one or more criteria associated with the pilot signal may indicate that the pilot signal cannot be used for ranging measurements; and the one or more criteria associated with the pilot signal may indicate that a coverage area associated with the pilot signal can be used for position determination. The one or more criteria associated with the supplemental position determination signal may indicate that it can be used for ranging measurements; and the one or more criteria associated with the supplemental position determination signal may indicate that a coverage associated with the supplemental position determination signal can be used for position determination.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DETAILED DESCRIPTION

Figure 1:
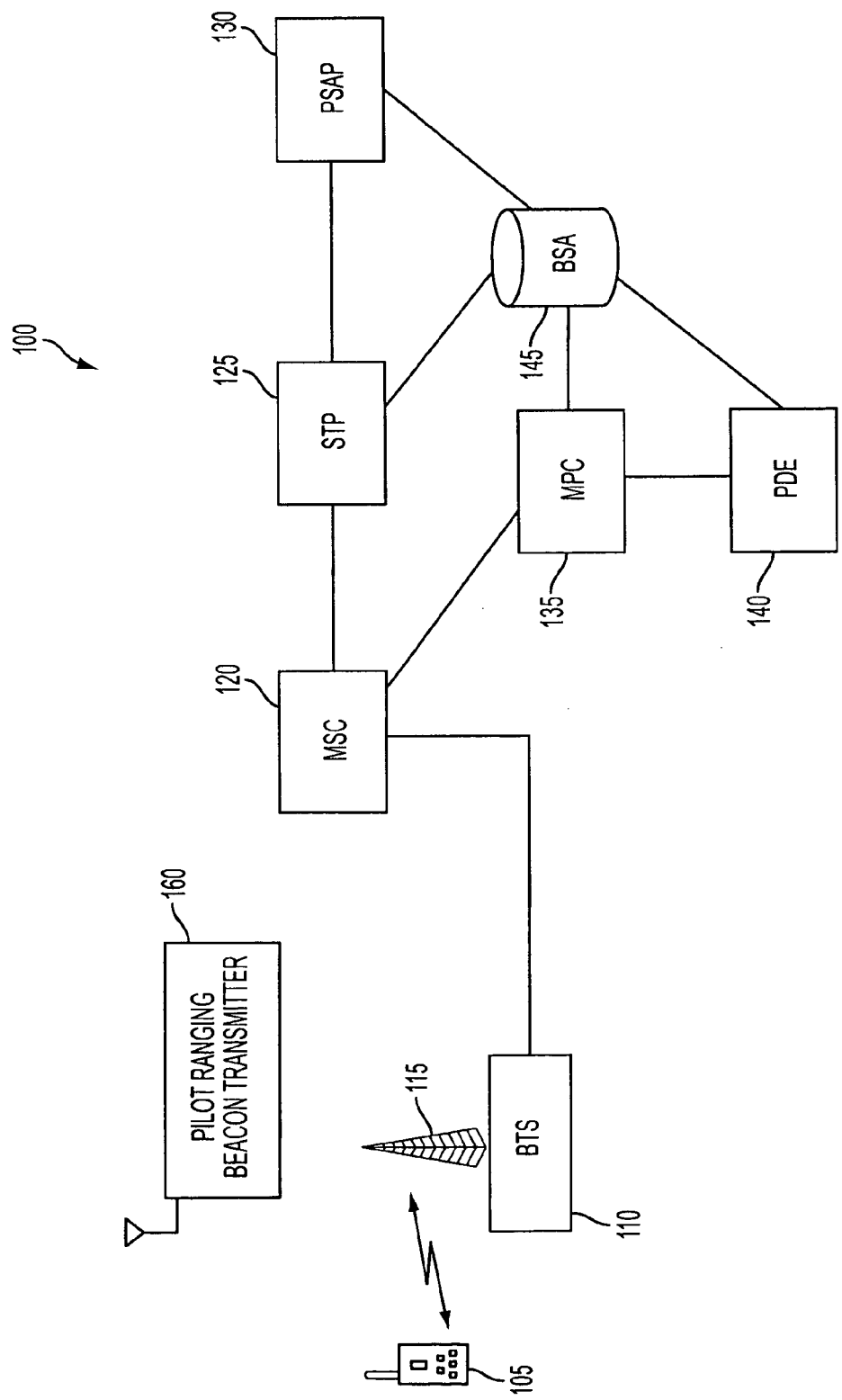
FIG. 1 illustrates an exemplary mobile communication network which may be configured for improving location determination for a mobile device location of which precludes it from an effective position determination by a standard position determination mechanism.

In the following detailed description, numerous specific details are set forth by way of examples in order to provide a thorough understanding of the relevant teachings. However, present teachings may be practiced without such details. In other instances, well-known methods, procedures, components, and circuitry have been described at a relatively high-level, without detail, in order to avoid unnecessarily obscuring aspects of the present teachings.

This disclosure describes systems and methods that improve location determination for a mobile device whose location precludes it from an effective or sufficiently accurate position determination by a standard position determination mechanism. To this end, the instant application utilizes a supplemental position determination signal (e.g., a co-pilot signal) that may be used exclusively for position determination. The supplemental position determination signal may not be associated with an overhead channel set that is transmitted to support traffic channels required for voice or data communications. The supplemental position determination signal may be immune from the adverse or negative impact of repeaters and other network components used to bring the RF from outside to inside of the building or the area served by the DAS.

The supplemental position determination signal may be generated by a Pilot Ranging Beacon Transmitter ("PRBT") and could be deployed in conjunction with other in-building coverage solutions to augment indoor subscriber location. The mobile device detects the supplemental position determination signal and reports the same to PDE. The PDE may include a database that is augmented to include an entry about the supplemental position determination signal.

In one implementation, the entry reflects that PDE should use the location of the PRBT as the location of the mobile device. That is, the PDE should forgo the normal position determination processing and declare the mobile device's location to be at the coordinate location of the PRBT as defined in the database without generating a standard AFLT solution. This scenario may be limited to cases in which the supplemental position determination signal is confined to a small area as defined by the value associated with the MAR. To this end, a flag may be set in the database that declares the mobile device's location to be the same as that of the PRBT.

In another implementation, the PRBT is collocated with an outdoor DAS node that is among a group of nodes simulcasting the capacity of a single sector of the surrounding public cellular network. The PRBT's signal would not be simulcast. Therefore, the PRBT's signal would provide an additional useable, local, and precise position reference source that can easily and unambiguously be used with the existing AFLT algorithm.

For purposes of the present discussion of examples, the description and drawings place the location determination in the context of emergency services (e.g., 911 call processing). Those skilled in the art would recognize, however, that the location information obtained by processing like that disclosed here may be used in any solution based services, including commercial services that the network service provider(s) may offer to their subscribers.

FIG. 1 illustrates an exemplary mobile communication network 100. Technologies for improving location determination for a mobile device whose location precludes it from an effective or sufficiently accurate position determination by a standard position determination mechanism may be implemented in the network 100. The network 100 includes a mobile device 105, a Base Transceiver System ("BTS") 110, an antenna 115, a Mobile Switching Center ("MSC") 120, a Signal Transfer Point ("STP") 125, a Mobile Positioning Center ("MPC") 135, a PDE 140, and a database 145.

In one implementation, the network 100 shows the network elements involved between a subscriber of mobile device 105 and the point where the first responder (e.g., police, fire, EMS, Coast Guard) is selected. In practice, there may be any number of other network elements that are not shown and described in this disclosure. For example, the single mobile device 105, single BTS 110 and single antenna 115 are merely shown for illustrations and their number are not meant to be limiting. Indeed, network 100 may provide mobile communications for numerous other mobile devices though numerous other base stations.

The network 100 offers many services such as, for example, packet data services and mobile voice telephone services. The discussions here, however, will focus on position determination (e.g., services for determining location of mobile device 105 within the communication network). The mobile device 105 represents a general class of mobile devices that operate via public cellular networks or the like. To this end, mobile device 105 includes hardware and software that enables it to act as a mobile phone. The mobile device 105 may be, for example, a wireless phone, a personal digital assistant, a portable e-mail device (e.g., a Blackberry®), a pager, or other electronic devices capable of communicating over network 100.

The BTS 110 may serve as a hub for radio communications and may support sub-layers of an air-link protocol carried for transmitting and/or receiving data packets to and/or from mobile devices 105. The BTS 110 could be using one of several mobile access technologies for allowing a mobile device 105 to connect to MSC 120. For example, BTS 110 may be using access technologies such as global system for mobile communications ("GSM"), general packet radio service ("GPRS"), code division multiple access ("CDMA"), ultra mobile broadband ("UMB"), long term evolution ("LTE"), and/or WiMax. The BTS 110, however, is not limited to these technologies and may use other technologies.

Regardless of the type of technology used by BTS 110, it is configured to allow any compatible mobile device 105 to connect to MSC 120. To this end, using its antenna 115, BTS 110 communicates with mobile device 105. The antenna 115 servers a subset of the overall geography covered by network 100. For example, in FIG. 1, antenna 115 covers mobile device 105 in one region or "cell" of network 100, whereas other antennas cover mobile devices 105 in other regions or "cells" of network 100.

The BTS 110 is configured to assign and reassign channels to mobile device 105 and to monitor the signal levels to recommend hand-offs to other base stations. In a typical current example, there are four channels. Three of the channels are for overhead, and one of the channels carries traffic (e.g., either data or voice). Of the three channels that are used for overhead, the simplest channel is called a pilot channel. The pilot channel is a downlink channel that mobile device 105 uses to acquire the network's time base, so other more complex control or traffic channel information can be exchanged between BTS 110 and the mobile device 105. In one implementation, information about pilot signals received by mobile device 105 is returned to BTS 110 and used to facilitate handoff between sectors as well as AFLT position determination. The use of the pilot signal for position assessment will be described in more detail with respect to PDE 140 and FIGS. 2-5.

The network 100 also typically includes a Base Station Controller ("BSC") functionality (not shown) that controls the functions of a number of base stations and helps to manage how calls made by each mobile device are transferred (or "handed-off") from one serving BTS to another. Each wireless network equipment vender implements this function differently. Some vendors have a physical entity, which they call a BSC, while other vendors include this functionality as part of their MSC 120.

The MSC 120 supports both cellular voice and packet data services. As shown, MSC 120 may connect through trunk circuits to the various BTSs 110, which the respective switch serves and controls. In one implementation, MSC 120 provides voice service switching for calls between mobile devices via interconnecting trunks and to other devices via the PSTN network (not shown) (e.g., for calls to and from landline telephones). Additionally, MSC 120 also provides voice service switching via trunks to one or more MSCs in other carrier's wireless network for communications with other mobile device currently operating through other networks. Although not shown, connections also are provided to other networks, such as the public switched telephone network and the Internet.

The network 100 also includes one or more STP 125, typically deployed as mated pairs of STPs, coupled to MSC 120 and to elements of the PSTN through signaling system number 7 ("SS7") link sets. The STPs and the links thereto provide a signaling network, for use in managing call traffic. The network 100 may enable communication with a Public-Safety Answering Point ("PSAP") 130.

The PSAP 130 is a server responsible for handling emergency calls such as calls for police, ambulance and firefighter services. A PSAP normally receives voice telephone calls. However, discussion here focuses on location related functionality, including that of the PSAP 130. Most PSAPs are capable of locating callers using landline phones and many can handle mobile phones if the mobile service provides for such capability.

To comply with the 911 mandate, the mobile service providers should provide a mechanism for locating subscribers within their respective mobile network. The 911 mandate requires that the mobile service providers locate their respective subscribers within fifty (50) meters sixty-six percent (66%) of the times and locate their respective subscribers within one-hundred-fifty (150) meters ninety-five (95%) of the time. The mandate is subject to change and may be amended to require a more accurate position determination.

For example, the mandate may change to require a more refined footprint. The current mandate assesses compliance with the above accuracy statistics on a nationwide footprint basis. It is easier to meet these requirements on average over a large area, as performance in regions where highly accurate location determination are possibly offset or average out poor performance in other regions. In the future, compliance may be assessed on a county-by-county jurisdiction basis. Alternatively or additionally, the compliance may be assessed based on the network provider's ability to meet the above thresholds within a more limited area, such as a town inside a county or a university campus inside the town. The methods and systems discussed in the instant application can provide the mobile service provider with a flexibility to adapt to such changes. Some of these smaller areas present difficulties in performance of location determinations, therefore, reducing the footprint for statistically compliance increase the difficulty for the network operator to comply with the mandate.

For location based services, including mobile device 105 location during an emergency call, network 100 also includes MPC 135 and PDE 140. In assisted GPS (global positioning system) type deployments, for example, PDE 140 provides data to mobile device 105 to expedite satellite acquisition; and it may determine the actual latitude and longitude (final fix) of mobile device 105 based on GPS measurements taken by mobile device 105 at the PDE's request.

The process of locating mobile device 105 involves several elements. In practice, MSC 120 requests an instruction for routing to the closest PSAP; and in response MPC 135 or other similar element requests location information for a particular mobile telephone device from PDE 140. The MSC 120 serving mobile device 105 delivers messages to/from mobile device 105, including those exchanged with PDE 140, which provides the final fix to MPC 135 for further processing, e.g. to determine the closest PSAP 130 and for delivery of mobile device 105 location to PSAP 130.

The PDE 140 utilizes different techniques to provide a reliable position location for mobile device 105. In one scenario, in which mobile device 105 has a clear view of the sky, PDE 140 may be using GPS signals for position determination. If mobile device 105 does not receive sufficient GPS signals, PDE 140 may use a combination of GPS and a pilot signal provided by a BTS, such as, for example, BTS 110 for position determination. If mobile device 105 receives no GPS signals, PDE 140 may use the pilot signals provided by two or more of the BTSs, assuming there are sufficient numbers of them to enable trilateration, and may calculate through vector math the location of mobile device 105. Alternatively or additionally, if mobile device 105 reports that it hears two or more pilot signals associated with two or more BTSs, PDE 140 identifies the location of mobile device 105 to be in the area where the footprints of the two or more BTSs overlap.

To perform these calculations, PDE 140 references database 145. The database 145 may be referred to as a Base Station Almanac Database. The network elements that can be ranged to terrestrially are identified in database 145. When mobile device 105 detects a pilot signal during a location assessment attempt, mobile device 105 reports the pilot signal that it hears. This information is sent to the network and routed to PDE 140. In this manner, mobile device 105 identifies to PDE 140, the sector that is serving mobile device 105 and possible one or more other base station sector pilots that it hears (for sectors nearby but not currently servicing mobile device 105).

The PDE 140 will reference database 145 to determine what are the appropriate properties of those BTSs that can be heard and with the information that is available makes its calculation as best as it can. In one implementation, database 145 includes for each pilot signal a sector identification label, a coordinate pair associated with the source of the pilot signal, and/or a Maximum Antenna Range (MAR) value field which defines a reasonable boundary for the coverage footprint of the source of the pilot beacon signal.

Repeaters or bi-directional amplifiers are frequently used to bring RF energy into a building or the like where subscribers lack coverage ubiquity or sufficient capacity. However, as noted in the background section, the process of augmenting voice and data services through these devices delays the RF energy captured from the network as it passes through the repeaters. This delay has adverse impacts on subscriber position determination in a variety of RF circumstances known to exist in the macro RF network. To illustrate, the time base of the pilot signal used for position determination may be delayed when traveling through repeaters. As such, inaccuracies may be introduced in the position determination calculation by PDE 140. Problems also arise with respect to position or location determinations in regions served by some form of DAS.

In order to remedy these shortcomings, the instant application utilizes a supplemental position determination signal (e.g., a co-pilot signal) that may be used exclusively for position determination. The supplemental position determination signal is immune from the adverse or negative impact of repeaters and other network components used to bring the RF from outside to inside of the building or the area served by the DAS. As described in more detail below with respect to FIGS. 2-6, the supplemental position determination signal may be 1.25 MHz wide CDMA2000 pilot channel not associated with any of the overhead or traffic channels required to support voice or data communications. It is a signal that is transmitted specifically for augmentation of location determinations. Deployment of the dedicated position determination signal, for example, may facilitate an AFLT solution, may speed assistance functions in an assisted GPS solution, or may provide a direct sector location solution.

The supplemental position determination signal is transmitted uniquely to identify an area of interest. That is, the supplemental position determination signal includes a unique identifier. The unique identifier may include a Pseudo-random Number ("PN") code. The supplemental position determination signal may be generated by PRBT 160 and could be deployed in conjunction with other in-building coverage solutions to augment indoor subscriber location. Although PRBT 160 is shown in FIG. 1, its application and functionality is described in detail with respect to FIGS. 2-6. An important component to the operation feasibility of using PRBT 160 is the ability of PDE 140 to recognize the circumstance that there is a supplemental position determination signal being received that is known to be in a close proximity to the location of mobile device 105.

In one implementation, determining that PRBT 160 is in a close proximity of mobile device 105 includes determining that PRBT 160 is within 150 meters of mobile device 105. This may correspond to a scenario in which PRBT 160 is confined to a small area such as inside a building and is configured to provide location fix for the mobile devices inside the building, as described in more detail with respect to FIGS. 2A-2B and 3.

In another implementation, PRBT 160 is determined to be in a close proximity of mobile device 105 even though it is located more than 150 meters away from mobile device 105. This may correspond to a scenario in which PRBT 160 is collocated with an outdoor DAS, as described in more detail with respect to FIGS. 4A-4B. In either case, it is expected that PRBT 160 will have a BSA database entry and is assigned a unique identifier that appears on the serving sector's neighbor list.

There are two fundamental modes of operation for PRBT 160. In the first mode operation, the PRBT's supplemental position determination signal is confined to an area so small that when it is identified and reported by mobile device 105 to PDE 140, an exception processing routine is launched. The exception processing routine declares the mobile device's location to be at the coordinate location of PRBT 160 as defined in the BSA without generating a standard AFLT solution. To accomplish this, the PRBT BSA entry requires a flag to indicate the need for exception processing. The flag reflects that if you hear the supplemental position determination signal (e.g., the co-pilot signal) then you should be near the source thereof (e.g., PRBT 160). When a PRBT signal covers an area that is within the position determination accuracy objectives, that flag in BSA database will be set. This scenario is described in more details with respect to FIGS. 2A-2B, and 3.

In the second mode of operation, PRBT 160 is collocated with an outdoor DAS node that is among a group of nodes simulcasting the capacity of a single sector of the surrounding public cellular network. The PRBT's signal would not be simulcast. Therefore, the PRBT's signal would provide additional useable, local, and precise position reference sources easily and unambiguously used with the existing AFLT algorithm. This scenario is described in more detail with respect to FIGS. 4A-4B.

With this overview and now that the components of mobile communication network 100 have been fully described, it is perhaps helpful to utilize network 100 to describe how the supplemental position determination signal and PRBT are used to enhance the position determination capability of network 100. The PRBT can support at least three primary use cases. In one scenario, the PRBT may be collocated with a repeater antenna to provide one-hundred fifty (150) meter location accuracy to repeater coverage footprint. This is scenario is described in more detail with respect to FIGS. 2A-2B.

In another scenario, the PRBT may be used in conjunction with an indoor DAS. The DAS could be designed to allow for supplemental position determination signals to be distributed into different Location Base System ("LBS") performance zones. Each LBS zone may contain a supplemental position determination signal from a unique PRBT source; however, energy from the BTS sector carrying traffic channels may be distributed as a function of capacity as necessary across multiple LBS zones. This scenario is described in more detail with respect to FIG. 3.

In yet another scenario, the PRBT may be used in conjunction with an outdoor DAS that uses RF blasting techniques to provide position fix for mobile devices within the coverage footprint of the outdoor DAS. To this end, unique PRBT signals may be collocated at outdoor DAS nodes to compensate for the inability to use simulcast traffic sectors for ranging. These PRBTs could be collocated in the BTS or at the remote access point. However, each PRBT may be allowed to only transmit from a single location on the outdoor DAS infrastructure. In a DAS environment, sufficient nodes are required to provide coverage to the mobile device. Similarly, in a DAS environment, there should be a sufficient overlay of PRBTs to assure that mobile devices covered by the outdoor DAS for voice and data services are also covered by the DAS and augmentation reference PRBTs for LBS services. This scenario is described in more detail with respect to FIGS. 4A-4B.

Figure 2A:
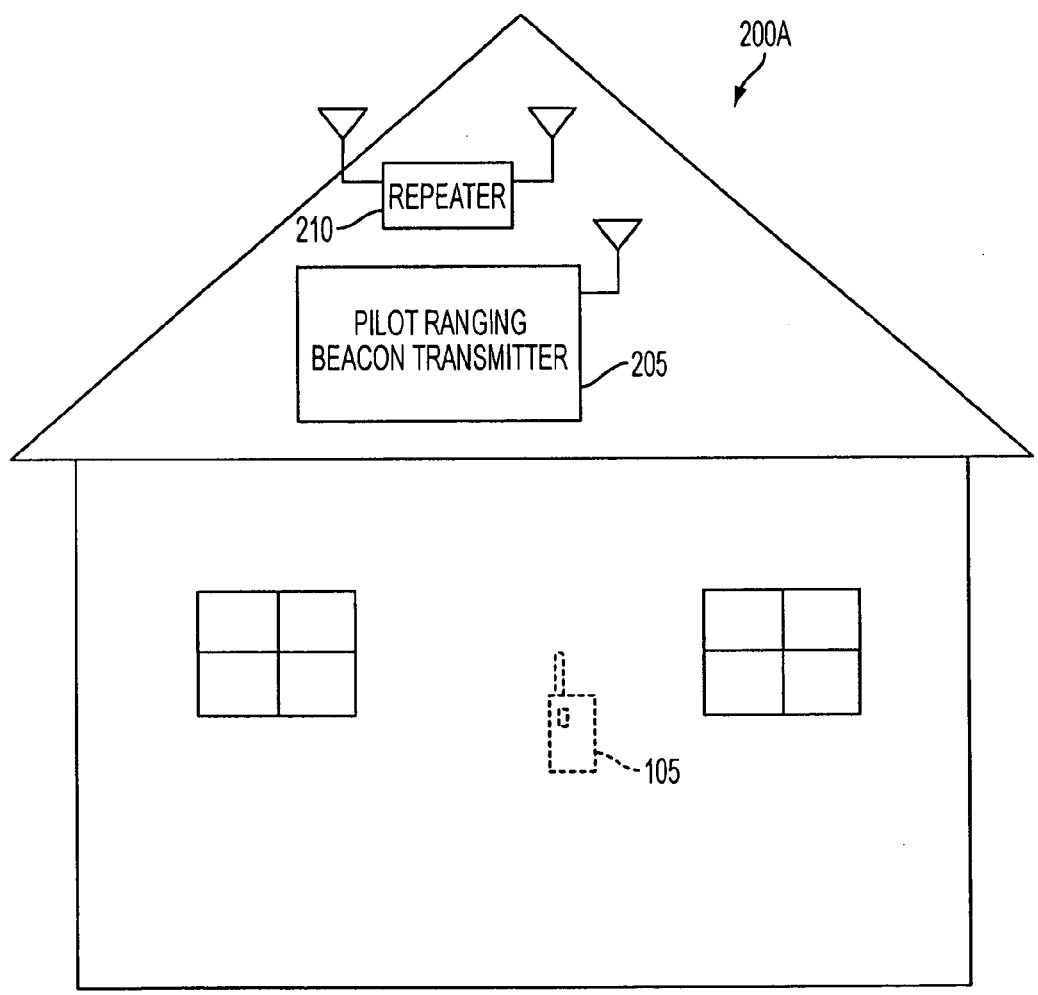
FIG. 2A illustrates an exemplary building in which a pilot ranging beacon transmitter ("PRBT") is collocated along with a repeater to enhance position determination for a mobile device located inside the building.

FIG. 2A illustrates an exemplary building 200A in which a PRBT is collocated along with a repeater to enhance position determination for an in-building subscriber of mobile device 105. The building 200A includes a PRBT 205 and a repeater and/or antenna 210. The repeater 210 is configured to receive the signal from outside of the building and retransmit the signal at a higher power within the building. In one implementation, building 200A is part of the network 100 shown in FIG. 1. That is, FIG. 2A illustrates a scenario in which mobile device 105 is located within building 200A. For sake of brevity, however, other components of network 100 are not shown in FIG. 2A.

Figure 2B:
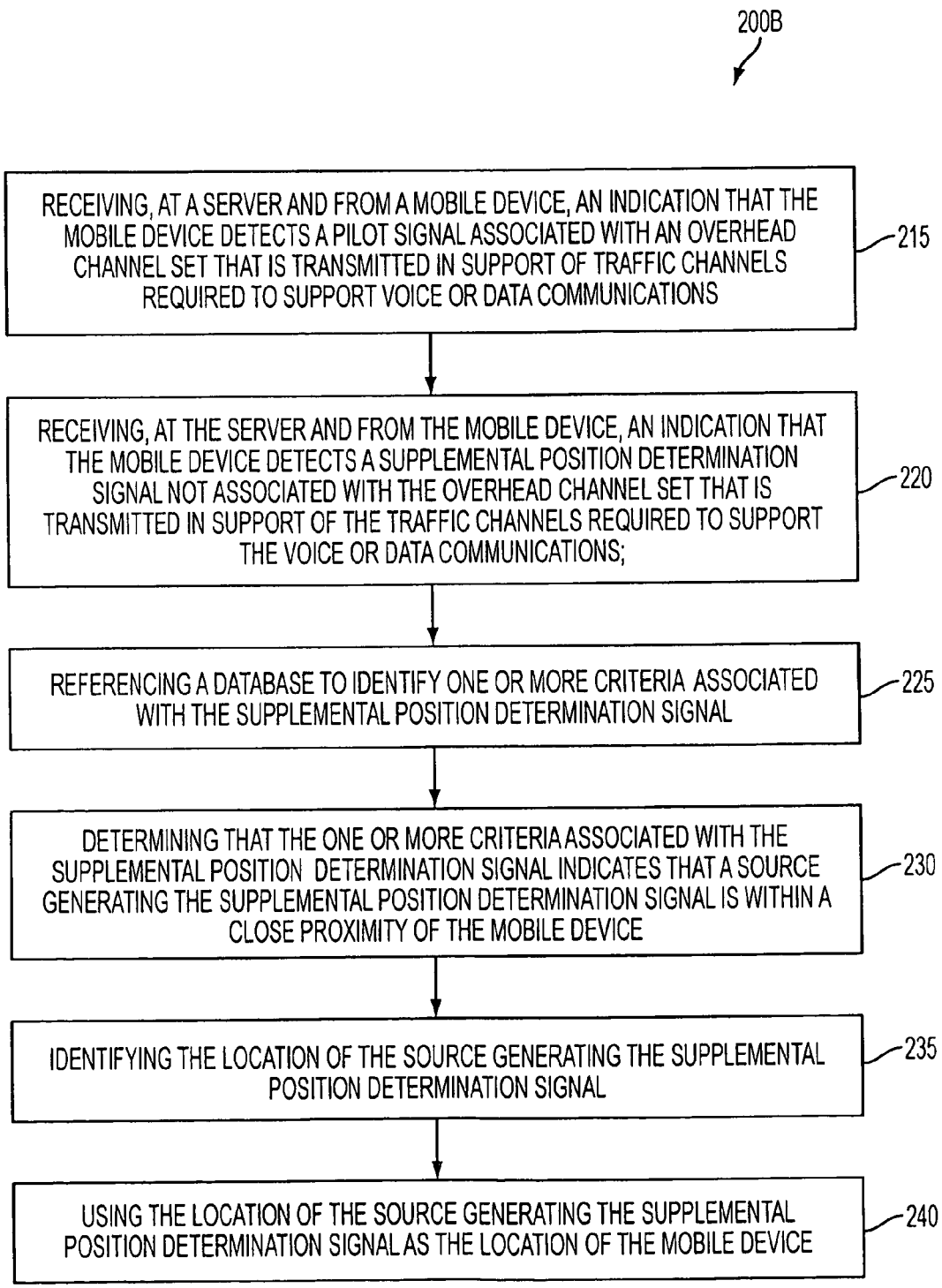
FIG. 2B illustrates an exemplary process used by a PDE to locate the mobile device shown in FIG. 2A using a supplemental position determination signal from the PRBT.

FIG. 2B illustrates an exemplary process 200B used by PDE 140 to locate mobile device 105 shown in FIG. 2A using a position determination signal from PRBT 205. The process 200B begins with PDE server 140 receiving, from mobile device 105, an indication that mobile device 105 detects a pilot signal and a supplemental position determination signal (215, 220). The pilot signal may be associated with an overhead channel set that is transmitted in support for traffic channels required to support voice or data communications, such as those from a BTS 110 that enter building 200A via repeater 210. Specifically, the pilot channel may be a downlink overhead channel that mobile device 105 uses to acquire network's time base for exchanging traffic channel information with BTS 110. However, since the pilot signal travels through repeater 210 to reach mobile device 105, it may be subject to delays. Therefore, it may introduce errors into calculations when used for position determination.

The supplemental position determination signal (e.g., the co-pilot signal) is generated by PRBT 205 and is not be associated with the overhead channel set that is transmitted in support for the traffic channels required to support voice or data communications via a BTS 110 or the cellular network 100. The supplemental position determination signal may be identified as a network element and, as such, may be described in electronic records or database 145 using similar format to that of the pilot signal transmitted from a base station. The supplemental position determination signal carries a different identifier (e.g., a PN code) than the pilot signal. Unlike the pilot signal transmitted from BTS 110, the supplemental position determination signal may only be used to determine location of mobile device 105.

Upon receiving the pilot signal and the supplemental position determination signal, PDE 140 references database 145 to identify one or more criteria associated with the supplemental position determination signal (225). The database 145 may include for each of the pilot signal and the supplemental position determination signal a sector identification label, a coordinate pair associated with the sources of the pilot signal and the supplemental position determination signal, and/or a MAR value field. In database 145, different coordinate pairs would be defined for network elements used for ranging or trilateration techniques (e.g., BTS 110) than would be defined for network elements used for proximity techniques (e.g., PRBT 205). The MAR defines a reasonable boundary for coverage footprint of the source (e.g., BTS 110) of the pilot signal and the source (e.g., PRBT 205) of the supplemental position determination signal. The pilot signal and the supplemental position determination signal each correspond to a separate entry in the database.

After referencing database 145, PDE 140 determines that the one or more criteria associated with the supplemental position determination signal indicates that the source (e.g., PRBT 205) generating the supplemental position determination signal is within a close proximity of mobile device 105 (230). As shown in FIG. 2A, PRBT 205 is collocated with a repeater antenna to provide a one-hundred-fifty (150) meter location accuracy to repeater coverage footprint. As such, the supplemental position determination signal is immune from delays that the pilot signal experiences going through repeater 210.

Based on the information in database 145, PDE 140 identifies the location of PRBT 205 (235) and uses the location of PRBT 205 as the location of mobile device 105 (240). That is, in this scenario, the supplemental position determination signal is confined to an area so small that when it is identified and reported by mobile device 105 to PDE 140, an exception processing routine is launched that declares mobile device 105 to be at a coordinate pair associated with PRBT 205 and defined in database 145 without carrying out additional calculations.

To this end, the entry associated with the supplemental position determination signal includes a flag inside database 145 for exception processing. The flag indicates to PDE 140 that the supplemental position determination signal covers an area that is within the position determination accuracy objectives, as such, the location of its source should be used for position of mobile device 105 and no further calculation is required.

When PDE 140 receives an identifier or such a supplemental position determination signal, the exception flag causes PDE 140 to skip to the position determination based solely on the PRBT location and essentially ignore any pilot signals generated from bases stations, e.g., the pilot signal generated from BTS 110 and heard by mobile device 105. In this connection, PDE 140 may decide not to use trilateration, hybrid, or GPS techniques due to the knowledge that the supplemental position determination signal heard by mobile device 105 has a coverage footprint that is smaller than the uncertainly associated with the distance measuring techniques. In one implementation, the supplemental position determination signal is identified by a unique PN code and is transmitted at less than twenty-five percent (25%) the power levels.

Figure 3:
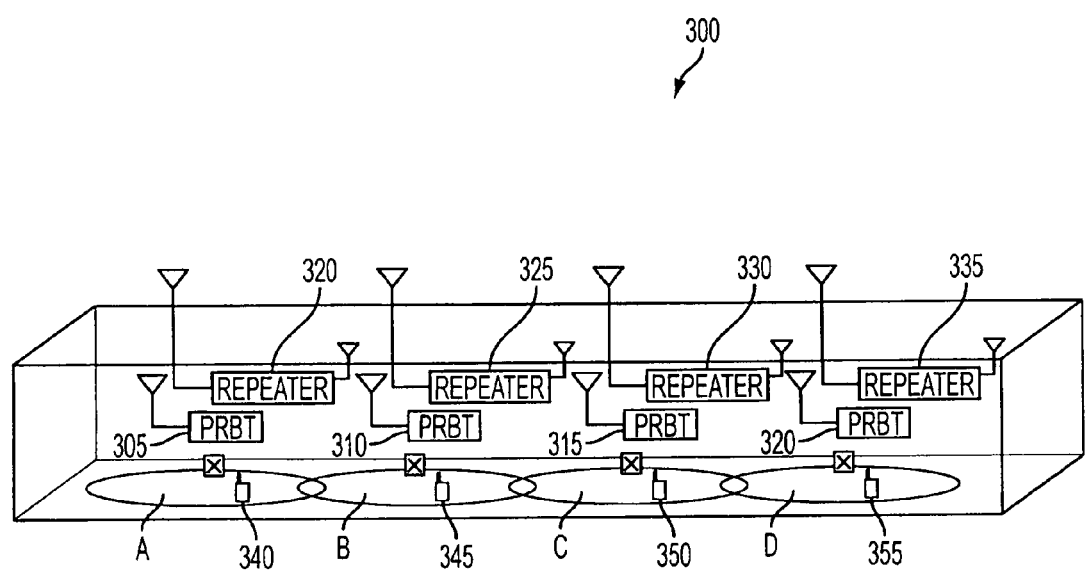
FIG. 3 illustrates an exemplary tunnel in which a plurality of PRBTs are located to enhance position determination for subscribers located inside the tunnel, along with a plurality of repeaters or antennas that support regular mobile communications.

Similar to FIGS. 2A-2B, FIG. 3 also illustrates a scenario in which a supplemental position determination signal generated by a PRBT is confined to an area so small that when it is identified and reported by a mobile device to PDE 140, an exception processing routine is launched that declares the location of mobile device 105 to be at the location of the PRBT, which is defined in database 145, without making additional calculation. The system described with respect to FIG. 3 may be associated with an environment in which the serving sector's overhead pilot signal contains ambiguity for range measurements, and the coverage area of the serving sector is well defined within a maximum antenna range footprint. As shown, in this environment, it may be desirable to divide the serving sector's coverage footprint into smaller position determination zones or as subsets of the larger serving sector's overall footprint.

To this end, the system may include multiple pilot beacon transmitters, each configured to provide a unique augmentation position determination signal in a particular subset of the serving sector's coverage area. For example, the first pilot beacon transmitter is configured to provide a first supplemental position determination signal in a first zone, whereas, the second pilot beacon transmitter is configured to provide a second supplemental position determination signal in a second zone. The deployment of multiple supplemental position determination signals allows for the identification of multiple proximity zones within a serving sector's coverage footprint. Each of the multiple supplemental position determination signals may include its own PN identifier and may not be associated with the overhead channel set that support the user's traffic channels required for voice or data communications.

FIG. 3 illustrates an exemplary tunnel 300 in which a plurality of PRBTs are located along with a plurality of repeaters or antennas to enhance position determination for mobile devices located inside tunnel 300. In one implementation, tunnel 300 is serviced by network 100 shown in FIG. 1. That is, FIG. 3 illustrates a scenario in which mobile device 105 is located within tunnel 300A. For sake of brevity, however, other components of network 100 that support actual voice and/or data communications are not shown in FIG. 3. Although FIG. 3 describes enhancing position determination for mobile devices within a tunnel, one of ordinary skill in the art would recognize that the process of enhancing position determination for mobile devices can equally apply in other environments such as, for example, high rises and air ports.

The tunnel 300 may be part of an underground metro which is carrying many subscribers. The tunnel 300 includes a plurality of PRBTs 305, 310, 315, and 320 and a plurality of antennas or repeaters 320, 325, 330, and 335. The antennas or repeaters 320, 325, 330, and 335 receive the signal from the outside of the tunnel and retransmit the signal within the tunnel with a higher power. Each of the PRBTs 305, 310, 315, and 320 is respectively assigned to each of the antennas or repeaters 320, 325, 330, and 335 and is configured to provide a supplemental position determination signal coverage in a particular zone. For example, PRBT 305 is configured to provide a first supplemental position determination signal coverage in zone A; PRBT 310 is configured to provide a second supplemental position determination signal coverage in zone B; PRBT 315 is configured to provide a third supplemental position determination signal coverage in zone C; and PRBT 320 is configured to provide a fourth supplemental position determination signal coverage in zone D.

The first, second, third and fourth supplemental position determination signals may not be associated with the overhead and traffic channels required to support voice or data communications and may only be used to determine location of mobile devices that fall within their coverage areas. To this end, each of the first, second, third and fourth supplemental position determination signals carry a different identifier from each other and from those pilot signals associated with overhead or traffic channels required to support voice or data communications via the network 100.

The zones A-D are relatively small such that when the supplemental position determination signal associated with a particular zone is identified and reported by a mobile device to PDE 140, an exception processing routine is launched that declares the position of the mobile device to be at the location of the PRBT associated with the reported supplemental position determination signal in a manner analogous to the process of FIG. 2B. To this end, PDE 140 is configured to receive from first mobile device 340 an indication first mobile device 340 detects the first supplemental position determination signal. Similarly, PDE 140 is configured to receive from second, third and fourth mobile device 345, 350, and 355 an indication that they respectively detect the second, third and fourth supplemental position determination signals.

Each of PRBTs 305, 310, 315, and 320 has an entry inside database 145 informing PDE 140 of the need for exception processing since they have a small coverage area. For example, database 145 may include an entry corresponding to first PRBT 305 indicating that its location should be exclusively used for determining the position of first mobile device 340. Similarly, database 145 may include an entry corresponding to second PRBT 310 indicating that its location should be exclusively used for determining the position of second mobile device 345.

As such, PDE 140, upon receiving the indication that first mobile device 340 detects the first supplemental position determination signal, identifies the location of first mobile device 340 as the location of first PRBT 305. Similarly, PDE 140, upon receiving the indication that second mobile device 345 detects the second supplemental position determination signal, identifies the location of second mobile device 345 as the location of second PRBT 310. The same process is carried out for third and fourth mobile devices 350, 355.

In addition to receiving reports that mobile devices 340, 345, 350, and 355 respectively detect first, second, third and fourth supplemental position determination signals, PDE 140 may also receive an indication that the mobile devices 340, 345, 350, and 355 receive pilot signals. The pilot signals may be associated with overhead or traffic channels required to support voice or data communications, e.g., via a BTS 110. However, PDE 140 decides not to use the pilot signals for determining the position of the mobile devices since a flag in database 145 directs PDE 140 to perform the exception processing described above.

Figure 4A:
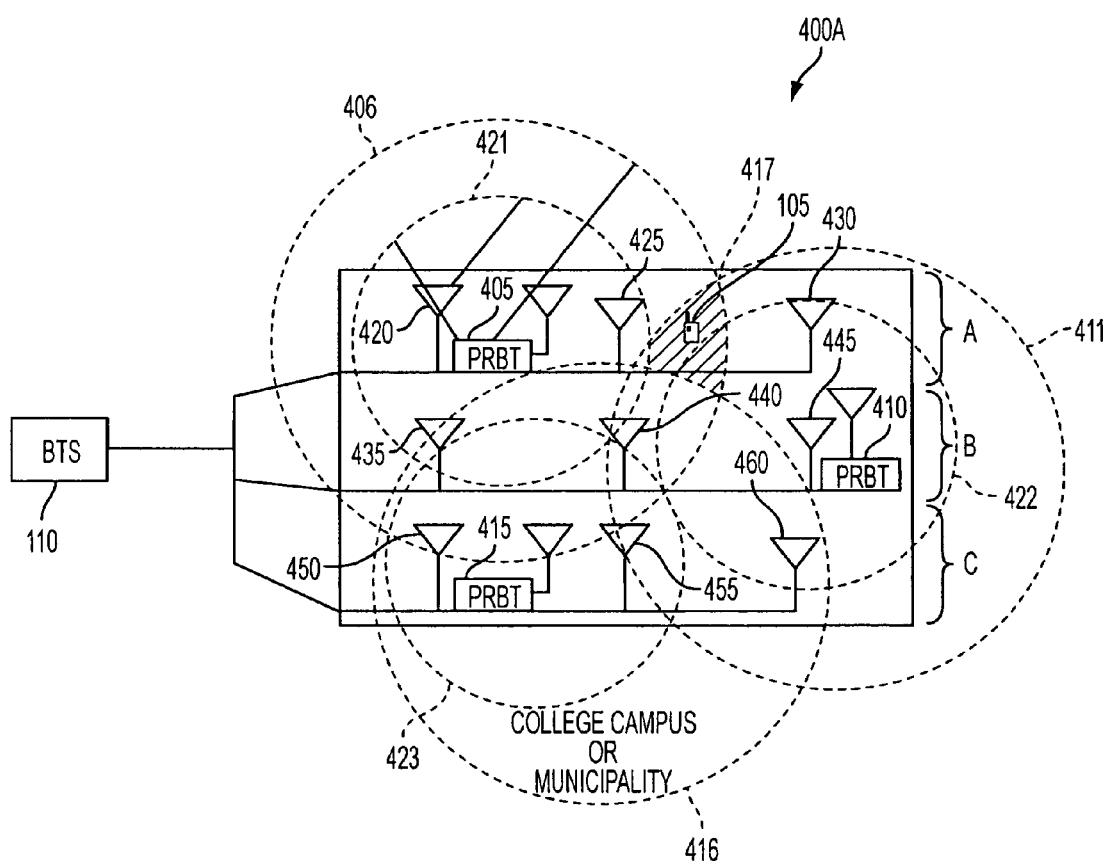
FIG. 4A illustrates an exemplary campus or municipality equipped with an outdoor DAS.
Figure 4B:
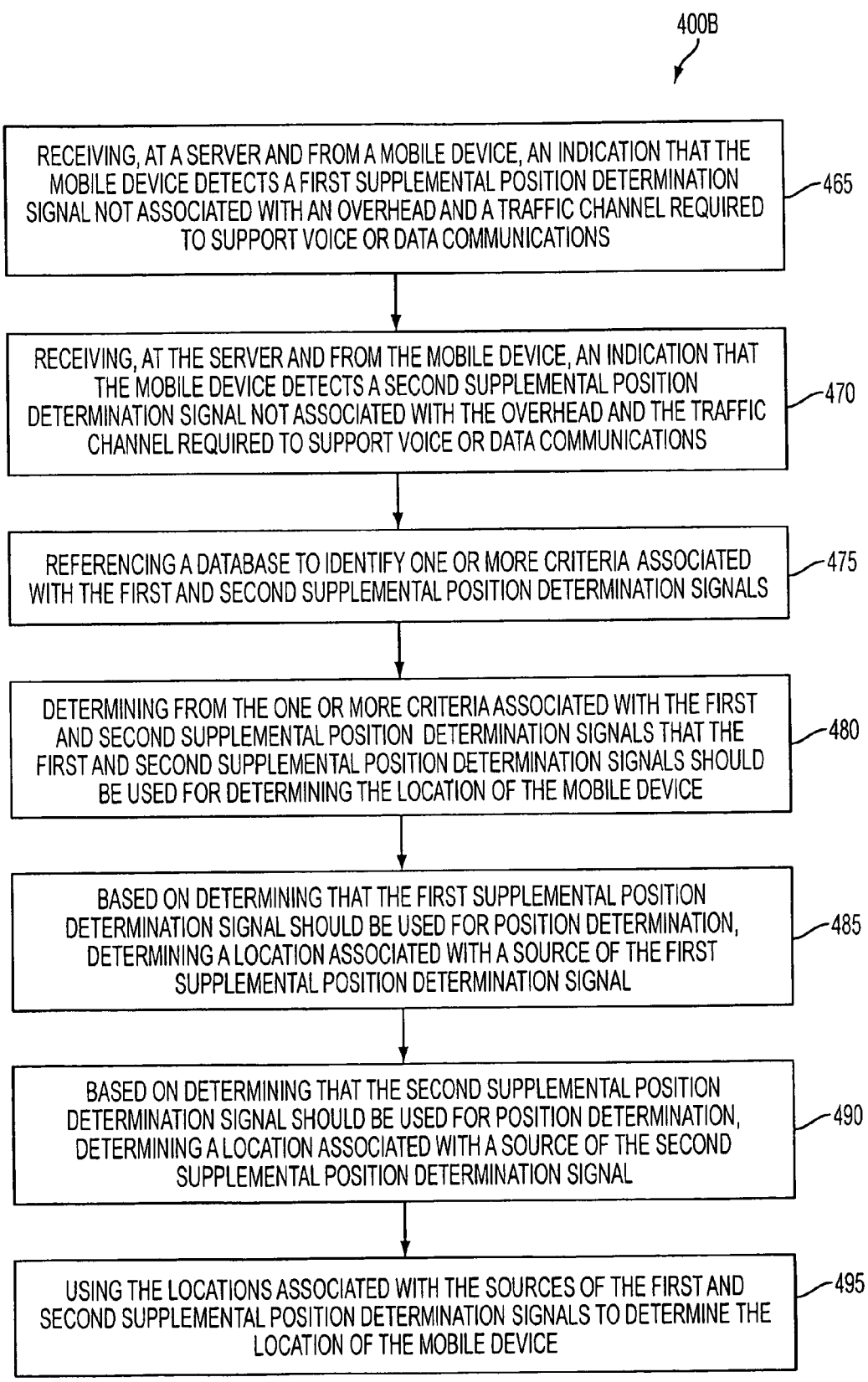
FIG. 4B illustrates an exemplary process used by PDE to locate a mobile device inside the campus or municipality shown in FIG. 4A.

FIGS. 4A-4B illustrate a scenario in which a plurality of PRBTs are used in conjunction with an outdoor DAS that uses RF blasting techniques to provide position fix for mobile devices within the coverage footprint of the outdoor DAS implemented in, for example, a university campus or a municipality. Each of the plurality of PRBTs may generate a unique supplemental position determination signal. The actual transmitter circuitry for the supplemental position determination signal may be collocated in the BTS or at the remote access point. However, each of the plurality of PRBTs may be allowed to transmit from a single location on the outdoor DAS infrastructure to keeps its signal immune from delays. There are sufficient overlay of PRBTs to assure that all in building subscribers covered by the outdoor DAS for voice and data services are also covered by the outdoor DAS and augmentation reference PRBTs for LBS services.

FIG. 4A illustrates an exemplary campus or municipality 400A equipped with an outdoor DAS. The campus or municipality 400A is divided into sectors A-C. Each sector includes a plurality of antennas and at least one PRBT that is in communications with BTS 110. Stated another way, instead of using a typical set of "cell" tower antennas, this type of BTS deployment connects BTS 110 to antennas distributed throughout or around the area of the campus or municipality. Typically, the power transmitter from any one antenna in a DAS is lower than the transmit power of a regular cell tower. Some DAS antennas may be inside building or repeaters (not shown) may be provided. For any given "sector" of the BTS coverage, the BTS actually can use several antennas at different points around the coverage area assigned to that "sector" of the DAS footprint.

In one implementation, the campus or municipality 400A is part of the network 100 shown in FIG. 1. That is, FIG. 4A illustrates a scenario in which mobile device 105 is located within campus or municipality 400A. For sake of brevity, however, other components of the network 100 are not shown in FIG. 4A.

The sector A includes antennas 420, 425, and 430 and a PRBT 405. The sector B includes antennas 435, 440, and 445 and a PRBT 410, and the sector C includes antennas 450, 455, and 460 and a PRBT 415. The antennas in sectors A-C may provide voice or data coverage for mobile devices located within the campus or municipality 400A. The PRBTs in sectors A-C may provide supplemental position determination coverage for mobile devices located within the campus or municipality 400A.

The coverage footprint of the antennas may be smaller than that of PRBTs. To illustrate, as shown in FIG. 4A, each of antennas 420, 445, and 450 has coverage footprints 421, 422, and 423 respectively, and each of PRBTs 405, 410, and 415 has coverage footprints 417, 411, and 416, respectively. As shown, the coverage footprints of the antennas 420, 445, and 450 is about half the coverage footprints of PRBTs 405, 410, and 415. In this manner, every node in campus or municipality 400A may have a voice and data coverage footprint that is a subset of the PRBT transmitter (e.g., PRBTs 405, 410, and/or 415).

The BTS 110 acts as a serving sector and provides the voice and data coverage for campus or municipality 400A. As shown, the base station energy is simulcast to sectors A-C. As pointed out in the background section, error may be introduced in the time base of the pilot signal from the serving sector due to simulcasting. As such, PDE 140 may be instructed not to use the pilot signal from the serving sector and instead uses the supplemental position determination signals (e.g., co-pilot signals) from local PRBTs 405, 410, and 415 for position determination.

Each of PRBTs 405, 410, and 415 may be allowed to transmit a supplemental position determination signal from a single location on the outdoor DAS infrastructure to keep its signal immune from delays. The supplemental position determination signal may be used for position determination and is not associated with any of the overhead and traffic channels required to support voice and data communications via the DAS BTS 110.

FIG. 4B illustrates an exemplary process 400B used by PDE 140 to locate subscribers inside campus or municipality 400A in the DAS scenario of FIG. 4A. The process 400B begins with PDE 140 receiving from a mobile device (e.g., mobile device 105) an indication that the mobile device detects a first supplemental position determination signal and a second supplemental position determination signal (e.g., a co-pilot signal) (465, 470). For discussion purposes, the first and second supplemental position determination signals may be generated by the PRBTs 405, 410, respectively. As such, the first and second supplemental position determination signals are not associated with any overhead or traffic channels required to support voice or data communications.

Upon receiving identification of the first and second position determination signals from mobile device 105, PDE 140 references database 145 to identify one or more criteria associated with the identified first and second supplemental position determination signals (475). The database 145 includes for each of the first and second supplemental position determination signals a sector identification label, a coordinate pair associated with the location of the sources of the first and second supplemental position determination signals, and/or a MAR value field. For example, the sector identification labels identify that the first supplemental position determination signal belongs to the sector A and the second supplemental position determination signal belongs to sector B.

The MAR values define reasonable boundaries for coverage footprints of the source (e.g., PRBT 405) of the first supplemental position determination signal and the source (e.g., PRBT 410) of the second supplemental position determination signal. As shown in FIG. 4A, the boundary for coverage of PRBT 405 corresponds to a boundary 406, the boundary for coverage of PRBT 410 corresponds to a boundary 411, and a boundary for coverage of PRBT 415 corresponds to a boundary 416.

The database 145 may also include a flag that informs PDE 140 that the first and second supplemental position determination signals should be used for position determination of the mobile device. As such and after referencing database 145, PDE 140 determines from the one or more criteria associated with the first and second supplemental position determination signals that the first and second supplemental position determination signals should be used for determining the position of mobile device (e.g., mobile device 105) (480). Based on this determination, PDE 140 determines a location associated with a source (e.g., PRBT 405) generating the first supplemental position determination signal (485). Similarly, PDE 140 determines a location associated with a source (e.g., PRBT 410) generating the second supplemental position determination signal (490).

The PDE 140 then uses the locations associated with the sources of the first and second supplemental position determination signals to determine the location of the mobile device (495). In one implementation, PDE 140 may use ranging process to determine the location of mobile device 105. In the ranging process, the location associated with the source of the first supplemental position determination signal may include the location of the first pilot beacon transmitter 405. Similarly, the location associated with the source of the second supplemental position determination signal may include the location of the second pilot beacon transmitter 410.

With this in mind, PDE 140 determines the time the first supplemental position determination signal was transmitted from the first pilot beacon transmitter 405 and the time the first supplemental position determination signal was received by mobile device 105. The difference is determined between the time that the first supplemental position determination signal was transmitted from the first pilot beacon transmitter 405 and the time that the first supplemental position determination signal was received by mobile device 105.

The PDE 140 further determines the time the second supplemental position determination signal was transmitted from the second pilot beacon transmitter 410 and the time the second supplemental position determination signal was received by mobile device 105. The difference is determined between the time the second supplemental position determination signal was transmitted from the second pilot beacon transmitter 410 and the time the second supplemental position determination signal was received by mobile device 105. The location determination then entails calculating the location of mobile device 105 based on these two differences.

In keeping with the previous example shown with respect to FIG. 4A, PDE 140 calculates the position of the mobile device (e.g. mobile device 105) to be in the grayed area 417. If a third (or more) position determination signal useable for location determination is available, trilateration may provide an even more precise solution. In the above-described scenario, the first and second pilot beacon transmitters may adjust their time base to compensate for time delays in other parts of network (e.g., time delays that may introduced when the supplemental position determination signal travels through a fiber to reach mobile device 105). This may result in a more accurate position determination for mobile device 105.

In another implementation, instead of using trilateration techniques, PDE 140 may use a mixed cell sector solution to identify the position of mobile device 105. In the mixed sector solution, the location associated with the source of the first supplemental position determination signal may include a coverage area of the source of the first supplemental position determination signal. Similarly, the location associated with the source of the second supplemental position determination signal may include a coverage area of the source of the second supplemental position determination signal. With this in mind, PDE 140 identifies the location of mobile device 105 to be in the area where the coverage areas of the two sources (e.g., PRBTs 405 and 410) overlap.

Although the above exemplary process 400B is described with respect to an outdoor DAS shown in FIG. 4A, it can also be used in an indoor area substantially deprived of macro network signals. That is, similar to the outdoor DAS, in the indoor environment the location of the mobile device may be identified based on time difference of arrival at the mobile device between two or more pilot beacon transmitters tactically located throughout the indoor area so as to facilitate an AFLT favorable geometry. In this circumstance, the pilot signals are used as a local cluster of range reference points each of which are characterized by a database record that indicates to the server that signals from these sources should be used for AFLT processing as they have been calibrated to deliver a position reference point of high quality. As such, PDE calculates the location of the mobile device based on two or more measurements signals from multiple pilot beacon transmitters.

Although three PRBTs 405, 410, and 415 are shown in FIG. 4A, additional PRBTs may be present. That is, in one implementation, the outdoor DAS 400A includes sufficient number of PRBTs so that the mobile devices including within DAS 400A can be located using the position determination signals associated with only the PRBTs. This is equally applicable to an indoor DAS. That is, an indoor DAS may include sufficient number of PRBTs so that the mobile devices including within DAS 400A can be located using the position determination signals associated with only the PRBTs.

In another implementation, each of the PRBT's signal may be confined to an area so small that when it is identified and reported by the mobile device 105 to PDE 140, an exception processing routine is launched that declares the mobile device's location to be at the coordinate location of the PRBT as defined in the BSA without further calculation. For example, the first supplemental position determination signal associated with PRBT 405 may be confined to sector A, and the second supplemental position determination signal associated with PRBT 410 may be confined to sector B. Similarly, the third supplemental position determination signal associated with PRBT 415 may be confined to sector C. Accordingly, when mobile device 105 reports to PDE 140 that it can hear the first supplemental position determination signal, PDE 140 performs an exception processing and identifies the location of mobile device 105 as that of PRBT 405.

The PDE 140 may also receives an indication that mobile device 105 detects pilot signals associated with overhead or traffic channels required to support voice or data communications. For example, PDE 140 may receive an indication that mobile device 105 detects pilot signal generated by BTS 110. However, upon determining that the first and second supplemental position determination signals should be exclusively used for determining the position of mobile device 105, PDE 140 decides not to use the pilot signal generated by BTS 110 for determining the position of mobile device 105. To this end, database 145 may include a flag that inform PDE 140 that the pilot signal generated by BTS 110 should be ignored.

In another implementation, PDE 140 may use at least one of the pilot signals in combination with the first and/or second supplemental position determination signals to determine the position of mobile device 105. In keeping with the previous example, PDE 140 may receive an indication that mobile device 105 detects pilot signal generated by BTS 110 and may also use this pilot signal in addition to the first and/or second supplemental position determination signals for determining the position of mobile device 105.

Figure 5:
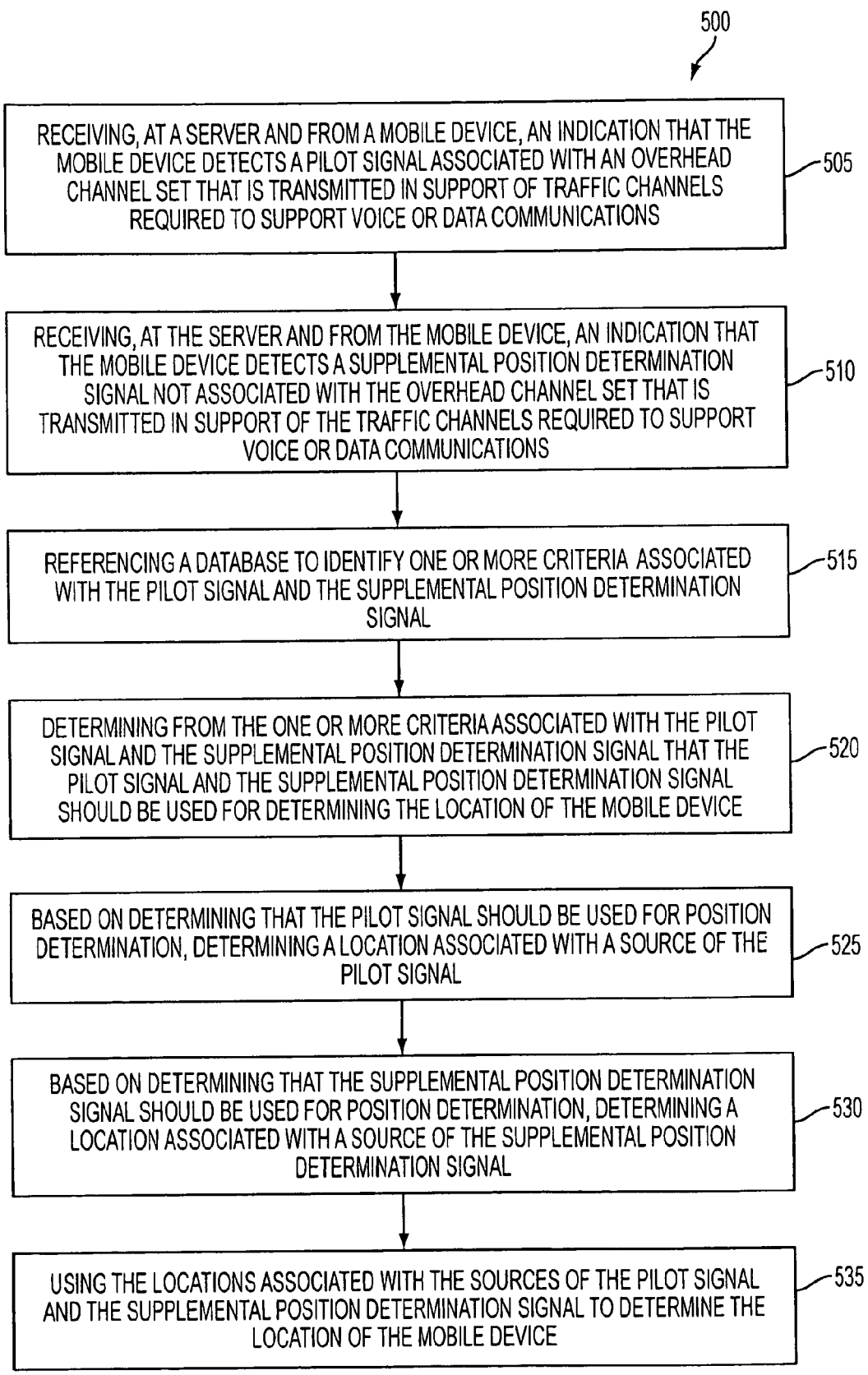
FIG. 5 illustrates an exemplary process used by PDE to locate a mobile device using a pilot signal and a supplemental position determination signal.

FIG. 5 illustrates an exemplary process 500 used by PDE 140 to locate position of mobile device 105 using a pilot signal and a supplemental position determination signal. The PDE 140 may use the exemplary process 500 for determining the location of mobile device 105 in one of the environments shown in FIGS. 2A, 3, and 4A. The process 500 begins with PDE 140 receiving from mobile device 105 an indication that mobile device 105 detects a pilot signal and a supplemental position determination signal (505, 510). The pilot signal and the supplemental position determination signal are described in detail with respect to at least FIGS. 2A and 2B and, therefore, they are not described here in more detail for the sake of brevity.

Upon receiving the pilot signal and the supplemental position determination signal, PDE 140 references database 145 to identify one or more criteria associated with the pilot signal and the supplemental position determination signal (515). The one or more criteria may indicate, for example, that the pilot signal and the supplemental position determination signal should be used in determining the position of mobile device 105.

After referencing database 145, PDE 140 determines from the one or more criteria associated with the pilot signal and the supplemental position determination signal that the pilot signal and the supplemental position determination signal should be used for determining the location of mobile device 105 (520). Based on such a determination, PDE 140 determines a location associated with a source of the pilot signal and a location associated with a source of the supplemental position determination signal (525, 530). Using the location associated with the sources of the pilot signal and the supplemental position determination signal, PDE 140 determines the location of mobile device 105.

In one implementation, PDE 140 may use ranging process to determine the location of mobile device 105. In the ranging process, the location associated with the source of the pilot signal may include the location of its source (e.g., BTS 110), and the location associated with the source of the supplemental position determination signal may include the location of the pilot beacon transmitter. With this in mind, PDE 140 determines the time the pilot signal was transmitted from the base station and the time the pilot signal was received by mobile device 105. The difference is determined between the time that the pilot signal was transmitted from the base station and the time that the pilot signal was received by mobile device 105.

The PDE 140 further determines the time the supplemental position determination signal was transmitted from the pilot beacon transmitter and the time the supplemental position determination signal was received by mobile device 105. The difference is determined between the time the supplemental position determination signal was transmitted from the pilot beacon transmitter and the time the supplemental position determination signal was received by mobile device 105. The location determination then entails calculating the location of mobile device 105 based on these two differences.

In the above-described scenario, the pilot beacon transmitter may adjust its time base to compensate for time delays in other parts of network (e.g., time delays that may introduced when the supplemental position determination signal travels through a fiber to reach mobile device 105). This may result in a more accurate position determination for mobile device 105.

In another implementation, PDE 140 may use a mixed cell sector solution to identify the position of mobile device 105. In particular, the one or more criteria associated with the pilot signal may indicate that the pilot signal may not be used in trilateration measurements and may only be used in mixed cell sector solution to identify the location of mobile device 105. In contrast, the one or more criteria associated with the supplemental position determination signal may indicate that the supplemental position determination signal can be used in both trilateration measurements and mixed sector solutions to identify location of mobile device 105.

In the mixed sector solution, the location associated with the source of the pilot signal may include a coverage area of the source of the pilot signal. Similarly, the location associated with the source of the supplemental position determination signal may include a coverage area of the source of the supplemental position determination signal. With this in mind, PDE 140 identifies the overlapping area between the coverage footprints of the sources of the pilot signal and the supplemental position determination signal as the location of mobile device 105.

Figure 6:
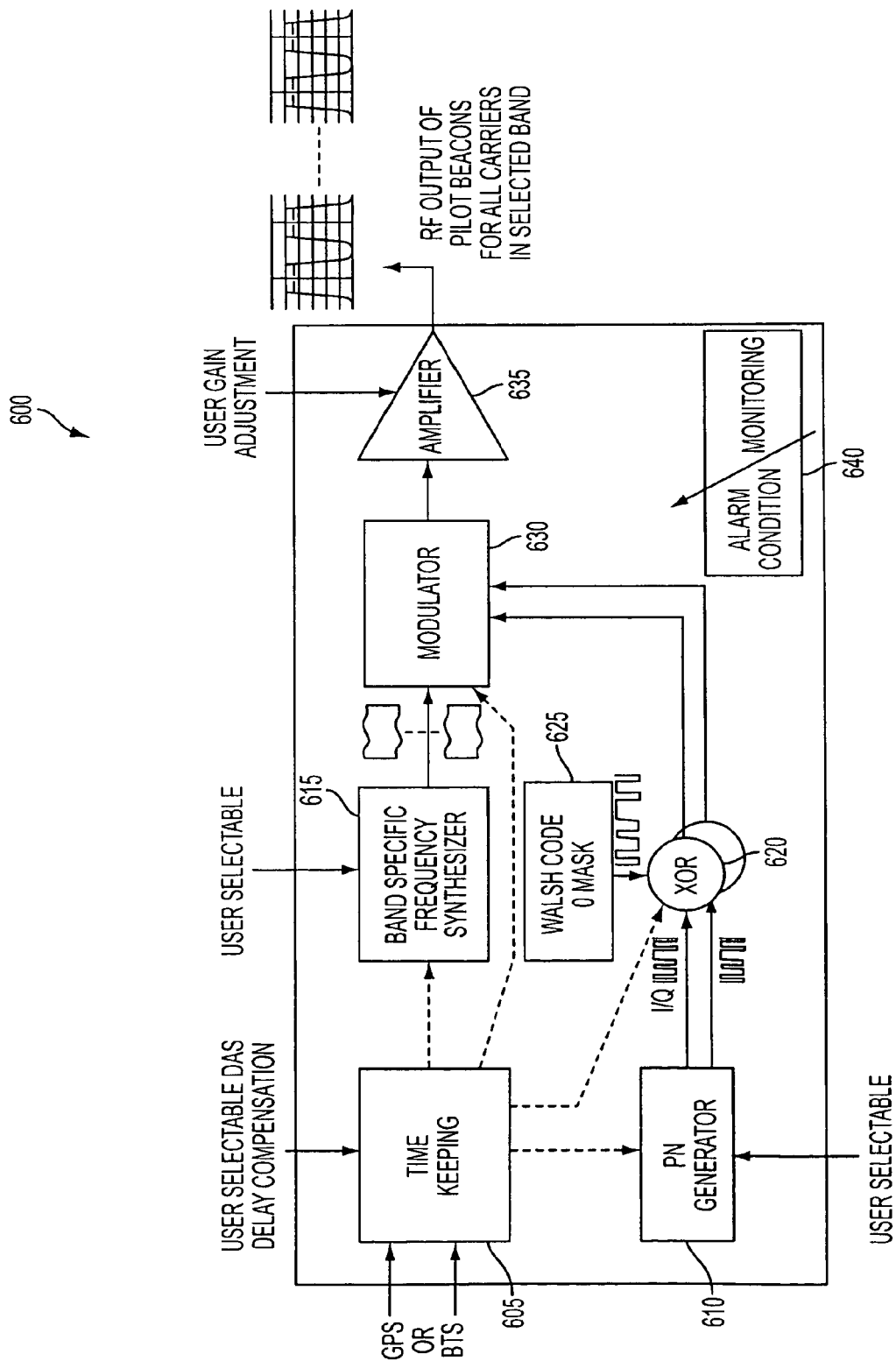
FIG. 6 illustrates an exemplary PRBT used for position determination enhancement.

FIG. 6 illustrates an exemplary PRBT 600 for position determination enhancement, which may be used in systems like those described above. The PRBT 600 includes a time keeping unit 605, a Pseudo-Random Noise ("PN") generator 610, a band specific frequency synthesizer 615, an XOR 620, a Walsh code 0 mask 625, a modulator 630, and an amplifier 635. The time keeping unit 605 is configured to adjust the time base of GPS or BTS signals to offset a delay that may be introduced in the supplemental position determination signal generated by the PRBT 600 due to repeaters or other active components of the network through which the supplemental position determination signal travels to reach the mobile device.

The PN generator 610 generates a unique identifier for the supplemental position determination signal to enable the PDE to recognize and distinguish the supplemental position determination signal from other supplemental position determination signals and pilot signals. The PRBT 600 is slaved to network time such that the signal it transmits is emitted concurrently with the other signals of the synchronized CDMA network. A time keeping unit 605 can either derive network time from GPS time or utilize a system time output clock signal from a traffic carrying base station.

The time keeping unit 605 aligns the sequences that come out of the PN generator 610 with system time. The PN sequence may be different for the in-phase (I) and quatrature (Q) sub-channels of the pilot signal. Walsh Code 0 is overlaid on the PN sequence using the 'XOR' time sequenced gating function 620 and a Mask 625 to turn the sequence into the baseband digital information that becomes the identifying information of the Pilot Beacon channel.

The timekeeping unit 605 also provides reference time for the synthesizer circuitry 615. This synthesizer 615 makes an analog RF sine wave for each slice of spectrum (carrier) in the band. The digital pilot information needs to be modulated onto the basic sine wave such that the information is encoded in Quadrature Phase Shift Keying ("QPSK") format. This low amplitude signal, from QPSK modulator 630, is amplified to an appropriate level based on the unique RF circumstances in existence.

As service providers are authorized to transmit in their own licensed part of the spectrum, it may be necessary that PRBT 600 be configured so it does not emit radiation into the spectrum of others. Furthermore, the service providers parse their spectrum into slices of communication capability based upon the technology being used. Each slice of spectrum is called a carrier and it contains within its frequency envelope everything needed for communications, that is a set of traffic and overhead (facilitation and management) channels. Some slices of spectrum are used for voice and some for data. Position determination may use voice pilots at this time. Therefore, PRBT 600 needs to transmit its codes on those carriers where position determination measurements are made otherwise the signals would be pure interference while contributing no benefit.

It is also important that PRBT 600 provides an indication that it is operating correctly and provides a warning when/if it is not operating correctly. To this end, PRBT 600 includes an alarm monitoring condition unit 640. The alarm monitoring condition unit 640 is capable of transmitting alarms when PRBT 600 is not operating correctly.

Other implementations are contemplated.

What is claimed is:

1. A method for improving location determination in a wireless network, the method comprising:
    receiving, at a server and from a mobile device, an indication that the mobile device detects a first supplemental position determination signal not associated with an overhead channel set that is transmitted in support of traffic channels required to support voice or data communications;
    receiving, at the server and from the mobile device, an indication that the mobile device detects a second supplemental position determination signal not associated with the overhead channel set that is transmitted in support of the traffic channels required to support the voice or data communications;
    referencing a database to identify one or more criteria associated with the first and second supplemental position determination signals;
    determining from the one or more criteria associated with the first and second supplemental position determination signals that the first and second supplemental position determination signals should be used for determining the location of the mobile device;
    based on determining that the first supplemental position determination signal should be used for position determination, determining a location associated with a source of the first supplemental position determination signal;
    based on determining that the second supplemental position determination signal should be used for position determination, determining a location associated with a source of the second supplemental position determination signal; and
    using the locations associated with the sources of the first and second supplemental position determination signals to determine the location of the mobile device.

2. The method of claim 1, further comprising:
    receiving an indication that the mobile device detects one or more pilot signals associated with the overhead channel set that is transmitted with the traffic channels required to support the voice or data communications; and
    deciding not to use the one or more pilot signals for determining the position of the mobile device upon determining that the first and second supplemental position determination signals should be used for determining the position of the mobile device.

3. The method of claim 1, wherein:
    the source of the first supplemental position determination signal includes a first pilot beacon transmitter deployed within a campus or municipality to improve the location determination capability therein;
    the location associated with the source of the first supplemental position determination signal includes the location of the first pilot beacon transmitter;
    the source of the second supplemental position determination signal includes a second pilot beacon transmitter deployed within the campus or municipality to improve the location determination capability therein; and
    the location associated with the source of the second supplemental position determination signal includes the location of the second pilot beacon transmitter.

4. The method of claim 3, wherein the first and second pilot beacon transmitters are capable of adjusting their respective time base to compensate for time delays through signal distribution mechanism in another part of the network.

5. The method of claim 3, wherein using the locations associated with the sources of the first and second supplemental position signals to determine the location of the mobile device further includes:
    determining the time the first supplemental position determination signal was transmitted from the first pilot beacon transmitter and the time the first supplemental position determination signal was received by the mobile device;
    determining the difference between the time the first supplemental position determination signal was transmitted from the first pilot beacon transmitter and the time the first supplemental position determination signal was received by the mobile device;
    determining the time the second supplemental position determination signal was transmitted from the second pilot beacon transmitter and the time the second supplemental position determination signal was received by the mobile device;
    determining the difference between the time the second supplemental position determination signal was transmitted from the second pilot beacon transmitter and the time the second supplemental position determination signal was received by the mobile device; and
    calculating the location of the mobile device based on the difference between the time the first supplemental position determination signal was transmitted from the first pilot beacon transmitter and the time the first supplemental position determination signal was received by the mobile device and the difference between the time the second supplemental position determination signal was transmitted from the second pilot beacon transmitter and the time the second supplemental position determination signal was received by the mobile device.

6. The method of claim 1, the database includes a Base Station Almanac Database supplemented to include a record for each of the first and second supplemental position determination signals, the record including a sector identification label, a coordinate pair associated with the sources of the first and second supplemental position determination signals, and/or a Maximum Antenna Range value field which defines a reasonable boundary for coverage footprint of the sources of the first and second supplemental position determination signals.

7. The method of claim 1, wherein:
    determining the location associated with the source of the first supplemental position determination signal includes determining a coverage area associated with the source of the first supplemental position determination;
    determining the location associated with the source of the second supplemental position determination signal includes determining a coverage area associated with the source of the second supplemental position determination signal; and
    using the locations associated with the sources of the first and second supplemental position determination signals to determine the location of the mobile device includes using an overlap of the coverage area associated with the source of the first supplemental position determination signal and the coverage area associated with the source of the second supplemental position determination signal to determine the location of the mobile device.

8. The method of claim 6, wherein the Base Station Almanac Database further includes records for one or more pilot signals transmitted from one or more base stations.

9. The method of claim 8, wherein the first and second supplemental position determination signals have a format similar to that of the one or more pilot signals transmitted from the one or more base stations.

10. A Distributed Antenna System ("DAS") configured to improve location determination for a mobile device located within its coverage footprint, location of which precludes it from sufficiently accurate position determination by a standard position determination mechanism, the DAS comprising:
- a plurality of first antennas and a first pilot beacon transmitter, the plurality first antennas providing voice or data coverage for a mobile device located within a first coverage footprint of the DAS and the first pilot beacon transmitter providing a first supplemental position determination signal in a first coverage area of the DAS, the first supplemental position determination signal not associated with an overhead channel set that is transmitted in support of traffic channels required to support voice or data communications;
- a plurality of second antennas and a second pilot beacon transmitter, the plurality second antennas providing voice or data coverage for the mobile device located within a second coverage footprint of the DAS and the second pilot beacon transmitter providing a second supplemental position determination signal in a second coverage area of the DAS, the second supplemental position determination signal not associated with an overhead channel set that is transmitted in support of traffic channels required to support voice or data communications;
- a base station transmitter in communication with the plurality of first and second antennas to provide voice and data coverage within the first and second coverage footprints of the DAS; and
- a server in communications with the base station transmitter, wherein the server is configured to perform functions including functions to:
  - receive from the mobile device an indication that the mobile device detects the first supplemental position determination signal;
  - receive from the mobile device an indication that the mobile device detects the second supplemental position determination signal;
  - reference a database to identify one or more criteria associated with the first and second supplemental position determination signals;
  - determine from the one or more criteria associated with the first and second supplemental position determination signals that the first and second supplemental position determination signals should be used for determining the location of the mobile device;
  - based on determining that the first and second supplemental position determination signals should be used for position determination, determine the first coverage area associated with the first pilot beacon transmitter and the second coverage area associated with the second pilot beacon transmitter; and
  - identify the location of the mobile device based on the overlap of the first and second coverage areas.

11. The system of claim 10, wherein the server further includes functions to:
- receive an indication that the mobile device detects one or more pilot signals associated with the overhead channel set that is transmitted with the traffic channels required to support the voice or data communications; and
- decide not to use the one or more pilot signals for determining the position of the mobile device.

12. The system of claim 10, wherein the DAS includes an indoor DAS associated with a building.

13. The system of claims 10, wherein the DAS includes an outdoor DAS associated with a campus or municipality.

14. The system of claim 10, wherein the energy of the base station transmitter is simulcast to the first and second antennas.

15. The system of claim 10, wherein error is introduced in a time base of a pilot signal from the base station transmitter.

16. The system of claim 10, wherein a range of each of the first and second pilot beacon transmitters is within 150 meters.

17. The system of claim 10, wherein the first and second supplemental position determination signals are only used for position determination.

18. The system of claim 10, wherein the database includes a Base Station Almanac Database supplemented to include for each of the first and second supplemental position determination signals a sector identification label, a coordinate pair associated with the sources of the first and second supplemental position determination signals, and/or a Maximum Antenna Range value field which defines a reasonable boundary for coverage footprint of the sources of the first and second supplemental position determination signals.

19. The system of claim 10, wherein the first and second pilot beacon transmitters are capable of adjusting their respective time base to compensate for time delays through signal distribution mechanism in another part of the network.

* * * * *